US010023045B2

(12) United States Patent
Trost et al.

(10) Patent No.: US 10,023,045 B2
(45) Date of Patent: Jul. 17, 2018

(54) FRONT MODULE FOR A PASSENGER VEHICLE

(71) Applicant: Daimler AG, Stuttgart (DE)

(72) Inventors: Maik Trost, Nuertingen (DE); Volkmar Wolf, Altdorf (DE); Siegfried Zipperle, Aidlingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/546,519

(22) PCT Filed: Jan. 26, 2016

(86) PCT No.: PCT/EP2016/000124
§ 371 (c)(1),
(2) Date: Jul. 26, 2017

(87) PCT Pub. No.: WO2016/120011
PCT Pub. Date: Aug. 4, 2016

(65) Prior Publication Data
US 2018/0001761 A1    Jan. 4, 2018

(30) Foreign Application Priority Data

Jan. 27, 2015  (DE) ........................ 10 2015 000 922

(51) Int. Cl.
*B60K 11/04*    (2006.01)
*B60K 11/08*    (2006.01)

(52) U.S. Cl.
CPC ............ *B60K 11/085* (2013.01); *B60K 11/04* (2013.01); *B60Y 2304/05* (2013.01); *B60Y 2306/01* (2013.01)

(58) Field of Classification Search
CPC ....... B60K 11/04; B60K 11/085; B60K 11/08; B60Y 2304/078
See application file for complete search history.

(56) References Cited

U.S. PATENT DOCUMENTS

| 8,794,363 | B2 | 8/2014 | Wolf |
| 8,833,498 | B2* | 9/2014 | Charnesky ............... F01P 7/10 180/68.1 |
| 8,919,864 | B2 | 12/2014 | Kojima et al. |
| 9,148,870 | B2* | 9/2015 | Clevorn ............... H04W 68/00 |

FOREIGN PATENT DOCUMENTS

| DE | 10 2012 102 953 A1 | 10/2012 |
| DE | 10 2011 103 475 A1 | 12/2012 |
| DE | 10 2011 119 542 A1 | 5/2013 |
| DE | 10 2012 102 445 A1 | 9/2013 |
| DE | 10 2013 218 564 A1 | 3/2014 |
| EP | 1 266 818 A2 | 12/2002 |
| EP | 2 248 693 A2 | 11/2010 |
| JP | 2007-8190 A | 1/2007 |

OTHER PUBLICATIONS

PCT/EP2016/000124, International Search Report dated Apr. 19, 2016 (Two (2) pages).

* cited by examiner

*Primary Examiner* — John D Walters
*Assistant Examiner* — James J Triggs
(74) *Attorney, Agent, or Firm* — Crowell & Moring LLP

(57) ABSTRACT

A front module for a passenger vehicle is disclosed. The front module includes an adapter element via which a panel part of the front module is supported on a front module structure arranged behind it. An adjustable covering device of a cooling opening of a cooling device of the passenger vehicle is integrated into the adapter element.

11 Claims, 1 Drawing Sheet

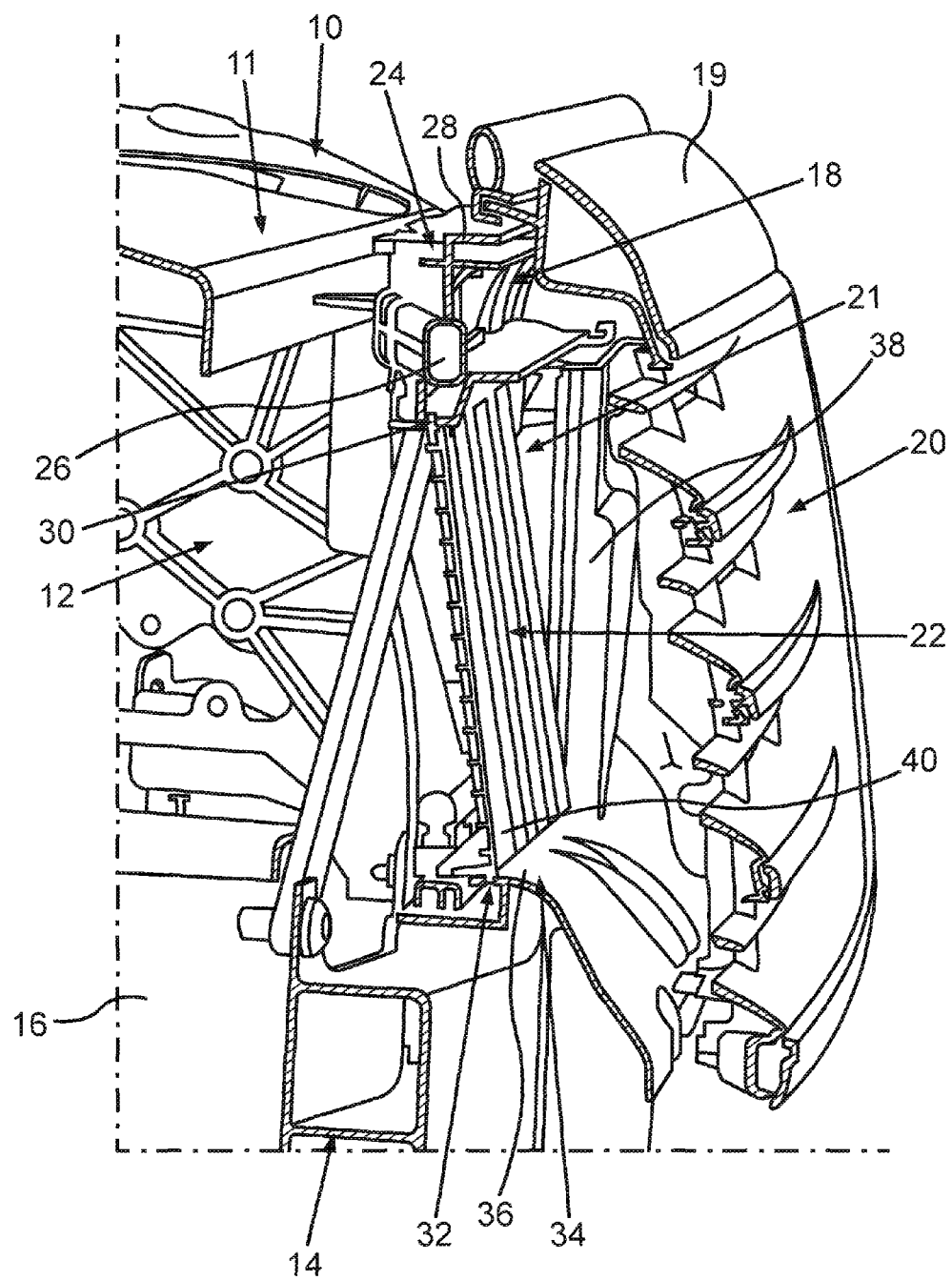

FRONT MODULE FOR A PASSENGER VEHICLE

BACKGROUND AND SUMMARY OF THE INVENTION

The invention relates to a front module for a passenger vehicle.

In known front modules for passenger vehicles, adapter elements are already used, by means of which a panel part of the front module, in particular a radiator grille, is fixed to a front module structure behind the front module. Here, the front module structure is in turn fixed on its shell side on a longitudinal member of an upper longitudinal member plane and comprises, for example, a so-called radiator bridge via which the two longitudinal members of the upper longitudinal member plane are connected to each other. The adapter element here serves to receive and support working loads which have an effect on the panel part or on the bumper as part of the front module, for example in the event of a frontal collision with a pedestrian. Here, the adapter element creates a simple possibility of adjusting the front module to different vehicle series of a vehicle family, for example.

However, to do so, a sufficient deformation space is required into which the panel part or the bumper as part of the front module can recede on colliding with a pedestrian. At the same time, this deformation space, however, is very tight since other devices also have to be housed in the region of the nose of the motor vehicle.

The object of the present invention is to create a front module of the type cited above by means of which particularly advantageous crash behavior of the passenger vehicle can be achieved.

In order to create a front module of the type cited above by means of which particularly advantageous crash behavior of the passenger vehicle can be achieved, it is provided according to the invention that a support element is allocated to the adapter element, the adapter element being supported on the support element on its underside on the upper side of a bending cross-member of a bumper arrangement, and an adjustable covering device of a cooling opening of a cooling device of the passenger vehicle is integrated into the adapter element.

Here, the covering device serves to open or at least partially close the cooling opening via which a cool air current produced by the airflow when driving can reach the cooling device and can flow through this. The cooling device can, for example, comprise at least one heat exchanger or similar by means of which heat can be removed from a liquid or gaseous coolant. For example and in particular, here, it can be cooling water for a motor but also for an oil cooler or similar. In the closed position of the covering device, at least one partial region of the cooling device is covered by the covering device forwards in the longitudinal direction of the vehicle such that airflow produced when driving cannot stream into or stream around at least one partial region of the cooling device when the passenger vehicle is traveling forwards. By doing so, advantageous aerodynamic performance of the passenger vehicle can be achieved, such that the energy consumption thereof decreases.

Here, what is to be understood by integration of the covering device according to the invention into the adapter element is that the adapter element performs corresponding functions for the covering device. In particular, this means that covering elements of the covering devices, for example, are adjustably mounted on the adapter element. Thus, the adapter element is allocated a double function since the adapter element, on the one hand, serves to support, in particular to fix, the panel part on the front module. On the other hand, the adapter element serves to integrate the covering device. As a result of this integration of the covering device into the adapter element, a particularly large, free deformation space can be created in the front region of the passenger vehicle, such that particularly advantageous pedestrian protection can be achieved, in particular in the load case of a collision with legs. This means that in the event of a possible collision of the passenger vehicle with a pedestrian, in particular in the region of their legs, the corresponding panel part can recede particularly easily and sufficiently far since, as a result of the integration of the covering device into the adapter element, a particularly large, free deformation space is available for absorbing accident energy.

In order to create a large, free deformation space, it has been shown to be advantageous if the covering device runs at an angle relative to the vertical in the installation position of the adapter element, and indeed in particular from the front downwards to the back upwards. As a result of this course, particularly advantageous pedestrian protection can be achieved since the pedestrian does not collide with excessively rigid components of the passenger vehicle in the event of a collision with the passenger vehicle.

In a further embodiment of the invention it is provided that the covering device is supported on its underside on the support element, on which the adapter element is thus also supported. As a result, a simple mounting of the respective covering elements of the covering device thus becomes possible.

A further advantageous embodiment of the invention provides that the covering device has a multitude of covering elements that run in parallel to one another, preferably in the vertical direction of the vehicle, in particular slats, which are mounted on opposite sides on corresponding mounts. In doing so, the adjustable covering device emerges in a simple manner in order to thus be able to adjust the airflow flowing through the cooling device. As a result of the vertical slats, the covering device can follow the shape of the bending member or the adapter. Thus, virtually the same construction space characteristics can be created in the perpendicular direction in every position.

By integrating the covering device into the adapter element, the covering device benefits from the stiffness of the adapter element and can thus be formed correspondingly optimally in terms of construction space. By connecting the covering device to the adapter element via individual fixing points, these can be failingly implemented in the load case of pedestrian protection and can lead to the covering device shifting backwards. It is advantageous for pedestrian protection that the connection stiffness can thus be defined and adjusted specifically to the connection points. In this case, it is also advantageous that the stiffness requirements of the adapter element and covering device can be defined independently of one another. This approach also applies to vehicles in which no adapter element is used. The function of the adapter element is here partially taken on by the cooling bridge.

It has further been shown to be advantageous if the respective upper mounts of the covering element, in particular the slats, are integrated into the adapter element. In doing so, an integration of the covering device in the adapter element that saves construction space, in particular, arises, the adapter element consequently having a corresponding multiple function. Here, a particularly simple adjusting possibility emerges by the respective upper mounts of the covering elements, in particular the slats, being formed as pivot mounts.

Furthermore, it has proved to be advantageous if the respective lower mounts of the covering elements, in particular the slats, are integrated into the support element. This also enables an arrangement of the covering device that saves construction space, wherein the support element has a multiple function. In this context, a particularly simple and reliable adjustability of the covering device emerges when the respective lower mounts of the covering elements, in particular the slats, are formed as pivot mounts.

It has further been shown to be particularly advantageous if the adapter element is formed at least in one partial region as a hybrid component which has a metallic material that is added to the hybrid component by means of a plastic. In doing so, properties of the adapter element can be adjusted to be in line with demand, such that the adapter element can be formed, for example, having a sufficient stiffness while simultaneously achieving a low weight of the adapter element.

Further advantages and details of the invention arise from the description of a preferred exemplary embodiment below, as well as with the aid of the drawing.

BRIEF DESCRIPTION OF THE DRAWING

The FIGURE shows a motor vehicle nose of a passenger vehicle in a perspective and cut-away side view, which is provided with a front module.

DETAILED DESCRIPTION OF THE DRAWING

The only FIGURE shows a motor vehicle nose of a passenger vehicle in a perspective and cut-away side view, which is provided with a front module 10 which is usually produced independently of the body of the passenger vehicle and is mounted on the body of the motor vehicle as part of the final mounting. For this, the front module 10 comprises a front module structure 12 and a bending cross-member 14, which extends at least substantially in the transverse direction of the vehicle in the installation position of the front module 10. The bending cross-member 14 forming one part of a bumper arrangement of the front module structure 12 is thus supported on the respectively corresponding main longitudinal member that runs behind in the longitudinal direction of the vehicle by means a respective energy absorption element 16, also called a crash box.

The front module structure 12 also has a superstructure 11 having a radiator bridge via which respective longitudinal members of an upper longitudinal member plane are connected to each other at the height of the respective wing supports. The superstructure 11 here extends downwards up to the bending cross-member 14.

Furthermore, the front module 10 comprises an adapter element 18 in its upper region, which is also called a front module adapter 18. By means of this adapter element 18, a panel part 19 of the front module 10 is fixed and supported on the front module structure 12 arranged behind. In the present exemplary embodiment, the panel part 19 is a bumper panel made of a plastic with which a bumper is paneled at least regionally forwards in the longitudinal direction of the vehicle and within which a radiator grille 20 is integrated, which is also called a radiator cowling.

The adapter element 18 is presently supported downwardly by an allocated support element 34 which is formed to be at least substantially U-shaped, having an under leg 36 running in the transverse direction of the vehicle and respective lateral legs 38. The support element 34, which is preferably produced in one piece out of a plastic material, is supported on the bending cross-member 14 on the upper side thereof by means of the lower leg 36. The adapter element 18 is also thus downwardly supported on the bending cross-member 14 by means of the lateral legs 38.

Presently, a substantially rectangular cooling opening 21 is bordered by the adapter element 18 and the supporting element 34, the cooling opening 21 being covered forwards by the radiator grille 20. A cool air stream produced by the airflow when driving reaches a cooling device of the passenger vehicle that is arranged behind it, though presently is not able to be seen, by means of this cooling opening 21 and flows through this cooling device. The cooling device, which is also called a cooling module, comprises at least one heat exchanger by means of which cooling water for a drive unit, for example, in particular an internal combustion engine, can be cooled. Alternatively or additionally, other heat exchangers or radiators, for example for oil, can also be provided. Here, the cooling device can be part of the front module 10 or, on the other hand, arranged on the side of the car body.

As can now be seen in the FIGURE, the front module 10 also comprises a covering device 22 which is also called a shutter. Seen in the longitudinal direction of the vehicle and when the motor vehicle is traveling in a forwards direction—the covering device 22 is arranged in front of the cooling device or cooling module and, presently, can be adjusted between a closed position and at least one open position. In the closed position, at least one partial region of the cooling opening 21 is closed such that when the passenger vehicle is traveling forwards, no cool air stream can reach the cooling device via this partial region of the cooling opening 21. The passenger vehicle, however, has advantageous aerodynamic performance as a result of this closing of the cooling opening 21, such that it can be driven in a particularly energy efficient or fuel-saving manner. In the open position, the covering device 22 releases at least the partial region of the cooling opening 21 such that, when the passenger vehicle is traveling in a forward direction, a cool air stream can reach the cooling device via this partial region of the cooling opening 21 and can flow through it to cool the working fluid thereof.

Presently, the covering device 22 comprises a multitude of covering elements arranged in parallel to one another and running in the vertical direction of the vehicle in the form of slats 40 which are mounted on opposing upper or lower sides on corresponding guides or mounts 30, 32. These mounts are presently formed by pivot or swivel mounts. The upper mounts 30 of the slats 40 are thus integrated into the adapter element 18; the lower mounts 32 are held on or in the support element 34 and are supported by this on the bending cross-member 12. Of course, instead of the pivot or swivel mounts, other mounts or guides of the covering elements 40 are also conceivable.

The integration of the covering device 22 into the adapter element 18 in this case means that the adapter element 18 takes on the functions of the mount of the respective slats 40 on its respective upper pivot/swivel mount. Of course, other functions of the covering device 22 can also be integrated into the adapter element 18, for example guiding the slats 40 or an adjusting device by means of which the slats 40 can be mounted between the closed position and the open position. In other words, the adapter element 18 is presently allocated a double function, namely, on the one hand, to hold the panel part 19 and, on the other hand, to take on other functions of the covering device 22.

The integration of the covering device 22 into the adapter element 18 here has the advantage that the two devices at least regionally share the available construction space such that particularly advantageous crash behavior and, in particular, particularly advantageous pedestrian protection can be obtained. Since the covering device 22 and the adapter element 18 share the available construction space, a sufficiently large, free deformation space remains in front of this construction space, the deformation space being available for deformation in the event of the passenger vehicle colliding with a pedestrian. In particular, the panel part 19 here has a large deformation space into which it can recede when force is applied to it as a result of an accident. In the event of a collision with legs, the pedestrian can thus be effectively protected.

In order to create a particularly large deformation space, the covering device 22 runs at an angle to the vertical direction of the vehicle and thus downwards from the front and upwards to the back in the longitudinal direction of the vehicle.

In the FIGURE, a cross-member region 24 of the adapter element 18 can be seen, which is formed as an aluminum-plastic hybrid component. For this purpose, the cross-member region 24 has a transverse element 26 made of aluminum that is provided with a plastic 28 and is thus added to the aluminum-plastic hybrid component. This takes place, for example, in an injection molding process.

The upper mount 30 of the slats 40 is presently injection molded on the cross-member region 24, that is to say formed by the plastic 28. Alternatively, it is conceivable that the upper mount 30 of the slats 40 is formed by a separate component which is latched to the cross-member region 24, for example. Furthermore, it is possible that the upper mount 30 of the slats 40 is formed as a separate component that is screwed to the cross-member region 24 and/or joined in a different manner.

The invention claimed is:

1. A front module for a passenger vehicle, comprising:
   a panel part;
   an adapter element, wherein the adapter element supports the panel part on a front module structure that is disposed behind the front module;
   a support element, wherein the adapter element is supported on the support element and wherein the support element is supported on an upper side of a bending cross-member of a bumper arrangement; and
   an adjustable covering device, wherein the adjustable covering device opens and closes at least one partial region of a cooling opening of a cooling device of the passenger vehicle, wherein the adjustable covering device is integrated into the adapter element.

2. The front module according to claim 1, wherein a rectangular cooling opening is bordered by the adapter element and the support element and wherein the cooling opening is covered in a front of the cooling opening by a radiator grille.

3. The front module according to claim 1, wherein the adjustable covering device is disposed at an angle to a vertical direction of the passenger vehicle.

4. The front module according to claim 3, wherein the adjustable covering device runs downward and forward from a top of the adjustable covering device.

5. The front module according to claim 1, wherein the adjustable covering device has a plurality of covering elements that are disposed parallel to one another.

6. The front module according to claim 5, wherein the plurality of covering elements are slats and wherein each of the slats have an upper mount and a lower mount.

7. The front module according to claim 6, wherein the respective upper mounts are integrated into the adapter element.

8. The front module according to claim 6, wherein the respective upper mounts are pivot mounts.

9. The front module according to claim 6, wherein the respective lower mounts are integrated into the support element.

10. The front module according to claim 9, wherein the respective lower mounts are formed as pivot mounts.

11. The front module according to claim 1, wherein the adapter element is formed as a metallic-plastic hybrid component at least in a partial region.

* * * * *